(12) United States Patent
Safa

(10) Patent No.: US 9,613,340 B2
(45) Date of Patent: Apr. 4, 2017

(54) METHOD AND SYSTEM FOR SHARED DOCUMENT APPROVAL

(75) Inventor: John Safa, London (GB)

(73) Assignee: Workshare Ltd. (GB)

( * ) Notice: Subject to any disclaimer, the term of this patent is extended or adjusted under 35 U.S.C. 154(b) by 172 days.

(21) Appl. No.: 13/160,772

(22) Filed: Jun. 15, 2011

(65) Prior Publication Data

US 2012/0324369 A1 Dec. 20, 2012

Related U.S. Application Data

(60) Provisional application No. 61/496,904, filed on Jun. 14, 2011.

(51) Int. Cl.
*G06F 17/24* (2006.01)
*G06Q 10/10* (2012.01)

(52) U.S. Cl.
CPC ......... *G06Q 10/101* (2013.01); *G06Q 10/103* (2013.01)

(58) Field of Classification Search
USPC ....................................................... 715/233
See application file for complete search history.

(56) References Cited

U.S. PATENT DOCUMENTS

| | | |
|---|---|---|
| 4,479,195 A | 10/1984 | Herr et al. |
| 4,853,961 A | 8/1989 | Pastor |
| 4,949,300 A | 8/1990 | Christenson et al. |
| 5,008,853 A | 4/1991 | Bly et al. |
| 5,072,412 A | 12/1991 | Henderson, Jr. et al. |
| 5,220,657 A | 6/1993 | Bly et al. |
| 5,245,553 A | 9/1993 | Tanenbaum |
| 5,247,615 A | 9/1993 | Mori et al. |
| 5,293,619 A | 3/1994 | Dean |
| 5,315,504 A * | 5/1994 | Lemble .......................... 700/90 |
| 5,379,374 A | 1/1995 | Ishizaki et al. |
| 5,446,842 A | 8/1995 | Schaeffer et al. |
| 5,608,872 A | 3/1997 | Schwartz et al. |

(Continued)

FOREIGN PATENT DOCUMENTS

| | | |
|---|---|---|
| JP | 10177650 | 6/1998 |
| JP | 2004265267 | 9/2004 |

(Continued)

OTHER PUBLICATIONS

Prinz, Wolfgang, and Sabine Kolvenbach. "Support for workflows in a ministerial environment." Computer Supported Cooperative Work: Proceedings of the 1996 ACM conference on Computer supported cooperative work. vol. 16. No. 20. 1996; pp. 2-4, 8.*

(Continued)

*Primary Examiner* — Jordany Nunez
*Assistant Examiner* — Mahelet Shiberou
(74) *Attorney, Agent, or Firm* — Sabety + associates, PLLC; Ted Sabety

(57) ABSTRACT

This invention discloses a novel system and method for displaying electronic documents that are subject to approval by multiple parties. The invention presents approval by person as a separate indication on the original document. The system automatically reviews the document to determine its type and then using the type, looks up the recipient list that is associated with that type of document. The document is then transmitted to those recipients for approval.

9 Claims, 5 Drawing Sheets

(56) References Cited

U.S. PATENT DOCUMENTS

| | | |
|---|---|---|
| 5,617,539 A | 4/1997 | Ludwig et al. |
| 5,619,649 A | 4/1997 | Kovnat et al. |
| 5,634,062 A | 5/1997 | Shimizu et al. |
| 5,671,428 A | 9/1997 | Muranaga et al. |
| 5,673,316 A | 9/1997 | Auerbach et al. |
| 5,699,427 A | 12/1997 | Chow et al. |
| 5,745,879 A | 4/1998 | Wyman |
| 5,751,814 A | 5/1998 | Kafri |
| RE35,861 E | 7/1998 | Queen |
| 5,787,175 A | 7/1998 | Carter |
| 5,801,702 A | 9/1998 | Dolan et al. |
| 5,806,078 A | 9/1998 | Hug et al. |
| 5,819,300 A | 10/1998 | Kohno et al. |
| 5,832,494 A | 11/1998 | Egger et al. |
| 5,850,219 A * | 12/1998 | Kumomura ............... 715/751 |
| 5,874,953 A | 2/1999 | Webster et al. |
| 5,890,176 A | 3/1999 | Kish et al. |
| 5,890,177 A | 3/1999 | Moody et al. |
| 5,898,836 A | 4/1999 | Frievald et al. |
| 6,003,060 A | 12/1999 | Aznar et al. |
| 6,009,173 A | 12/1999 | Sumner |
| 6,012,087 A | 1/2000 | Frievald et al. |
| 6,049,804 A | 4/2000 | Burgess et al. |
| 6,067,551 A | 5/2000 | Brown et al. |
| 6,088,702 A | 7/2000 | Plantz et al. |
| 6,145,084 A | 11/2000 | Zuili et al. |
| 6,169,976 B1 | 1/2001 | Colosso |
| 6,189,019 B1 | 2/2001 | Blumer et al. |
| 6,189,146 B1 | 2/2001 | Misra et al. |
| 6,212,534 B1 | 4/2001 | Lo et al. |
| 6,216,112 B1 | 4/2001 | Fuller et al. |
| 6,219,652 B1 | 4/2001 | Carter et al. |
| 6,219,818 B1 | 4/2001 | Frievald et al. |
| 6,243,091 B1 | 6/2001 | Berstis |
| 6,263,350 B1 | 7/2001 | Wollrath et al. |
| 6,263,364 B1 | 7/2001 | Najork et al. |
| 6,269,370 B1 | 7/2001 | Kirsch |
| 6,285,999 B1 | 9/2001 | Page |
| 6,301,368 B1 | 10/2001 | Bolle et al. |
| 6,321,265 B1 | 11/2001 | Najork et al. |
| 6,327,611 B1 * | 12/2001 | Everingham ............... 709/206 |
| 6,336,123 B2 | 1/2002 | Inoue et al. |
| 6,351,755 B1 | 2/2002 | Najork et al. |
| 6,377,984 B1 | 4/2002 | Najork et al. |
| 6,404,446 B1 | 6/2002 | Bates et al. |
| 6,418,433 B1 | 7/2002 | Chakrabarti et al. |
| 6,418,453 B1 | 7/2002 | Kraft et al. |
| 6,424,966 B1 | 7/2002 | Meyerzon et al. |
| 6,449,624 B1 | 9/2002 | Hammack et al. |
| 6,505,237 B2 | 1/2003 | Beyda et al. |
| 6,513,050 B1 | 1/2003 | Williams et al. |
| 6,547,829 B1 | 4/2003 | Meyerzon et al. |
| 6,556,982 B1 | 4/2003 | McGaffey et al. |
| 6,560,620 B1 | 5/2003 | Ching |
| 6,584,466 B1 | 6/2003 | Serbinis et al. |
| 6,591,289 B1 | 7/2003 | Britton |
| 6,594,662 B1 | 7/2003 | Sieffert et al. |
| 6,596,030 B2 | 7/2003 | Ball et al. |
| 6,614,789 B1 | 9/2003 | Yazdani et al. |
| 6,658,626 B1 | 12/2003 | Aiken |
| 6,662,212 B1 | 12/2003 | Chandhok et al. |
| 6,738,762 B1 | 5/2004 | Chen et al. |
| 6,918,082 B1 | 7/2005 | Gross |
| 7,035,427 B2 | 4/2006 | Rhoads |
| 7,107,518 B2 | 9/2006 | Ramaley et al. |
| 7,113,615 B2 | 9/2006 | Rhoads et al. |
| 7,152,019 B2 | 12/2006 | Tarantola et al. |
| 7,212,955 B2 | 5/2007 | Kirshenbaum et al. |
| 7,233,686 B2 | 6/2007 | Hamid |
| 7,240,207 B2 | 7/2007 | Weare |
| 7,299,504 B1 | 11/2007 | Tiller et al. |
| 7,321,864 B1 * | 1/2008 | Gendler ............... 705/7.15 |
| 7,353,455 B2 | 4/2008 | Malik |
| 7,356,704 B2 | 4/2008 | Rinkevich et al. |
| 7,434,164 B2 | 10/2008 | Salesin et al. |
| 7,454,778 B2 | 11/2008 | Pearson et al. |
| 7,496,841 B2 | 2/2009 | Hadfield et al. |
| 7,564,997 B2 | 7/2009 | Hamid |
| 7,613,770 B2 | 11/2009 | Li |
| 7,624,447 B1 | 11/2009 | Horowitz et al. |
| 7,627,613 B1 | 12/2009 | Dulitz et al. |
| 7,673,324 B2 | 3/2010 | Tirosh et al. |
| 7,680,785 B2 | 3/2010 | Najork |
| 7,694,336 B2 | 4/2010 | Rinkevich et al. |
| 7,720,256 B2 | 5/2010 | Desprez et al. |
| 7,730,175 B1 | 6/2010 | Roesch et al. |
| 7,788,235 B1 | 8/2010 | Yeo |
| 7,796,309 B2 | 9/2010 | Sadovsky et al. |
| 7,818,678 B2 | 10/2010 | Massand |
| 7,844,116 B2 | 11/2010 | Monga |
| 7,857,201 B2 | 12/2010 | Silverbrook et al. |
| 7,877,790 B2 | 1/2011 | Vishik et al. |
| 7,890,752 B2 | 2/2011 | Bardsley et al. |
| 7,895,276 B2 | 2/2011 | Massand |
| 7,903,822 B1 | 3/2011 | Hair et al. |
| 7,941,844 B2 | 5/2011 | Anno |
| 7,958,101 B1 | 6/2011 | Teugels et al. |
| 8,005,277 B2 | 8/2011 | Tulyakov et al. |
| 8,042,112 B1 | 10/2011 | Zhu et al. |
| 8,060,575 B2 | 11/2011 | Massand |
| 8,117,225 B1 | 2/2012 | Zilka |
| 8,140,513 B2 | 3/2012 | Ghods |
| 8,181,036 B1 | 5/2012 | Nachenberg |
| 8,196,030 B1 | 6/2012 | Wang et al. |
| 8,201,254 B1 | 6/2012 | Wilhelm et al. |
| 8,233,723 B2 | 7/2012 | Sundaresan |
| 8,286,085 B1 | 10/2012 | Denise |
| 8,286,171 B2 | 10/2012 | More et al. |
| 8,316,237 B1 | 11/2012 | Felsher et al. |
| 8,326,814 B2 | 12/2012 | Ghods |
| 8,381,104 B2 | 2/2013 | Massand |
| 8,406,456 B2 | 3/2013 | More |
| 8,471,781 B2 | 6/2013 | Massand |
| 8,473,847 B2 | 6/2013 | Glover |
| 8,478,995 B2 | 7/2013 | Alculumbre |
| 8,555,080 B2 | 10/2013 | More et al. |
| 8,620,020 B2 | 12/2013 | More |
| 8,635,295 B2 | 1/2014 | Mulder |
| 8,670,600 B2 | 3/2014 | More |
| 8,839,100 B1 | 9/2014 | Orofino, II |
| 8,977,697 B2 | 3/2015 | Massand |
| 2001/0042073 A1 | 11/2001 | Saether et al. |
| 2002/0010682 A1 | 1/2002 | Johnson |
| 2002/0019827 A1 | 2/2002 | Shiman et al. |
| 2002/0023158 A1 | 2/2002 | Polizzi et al. |
| 2002/0052928 A1 | 5/2002 | Stern et al. |
| 2002/0063154 A1 | 5/2002 | Hoyos et al. |
| 2002/0065827 A1 | 5/2002 | Christie et al. |
| 2002/0065848 A1 | 5/2002 | Walker et al. |
| 2002/0073188 A1 | 6/2002 | Rawson |
| 2002/0087515 A1 | 7/2002 | Swannack et al. |
| 2002/0099602 A1 | 7/2002 | Moskowitz et al. |
| 2002/0120648 A1 | 8/2002 | Ball et al. |
| 2002/0129062 A1 | 9/2002 | Luparello |
| 2002/0136222 A1 | 9/2002 | Robohm |
| 2002/0138744 A1 | 9/2002 | Schleicher et al. |
| 2002/0159239 A1 | 10/2002 | Amie et al. |
| 2002/0164058 A1 | 11/2002 | Aggarwal et al. |
| 2003/0009518 A1 | 1/2003 | Harrow et al. |
| 2003/0037010 A1 | 2/2003 | Schmelzer |
| 2003/0046572 A1 | 3/2003 | Newman et al. |
| 2003/0046639 A1 * | 3/2003 | Fai et al. ............... 715/513 |
| 2003/0061260 A1 | 3/2003 | Rajkumar |
| 2003/0090513 A1 | 5/2003 | Ramakrishnan |
| 2003/0097454 A1 | 5/2003 | Yamakawa et al. |
| 2003/0112273 A1 | 6/2003 | Hadfield et al. |
| 2003/0115273 A1 | 6/2003 | Delia et al. |
| 2003/0121008 A1 | 6/2003 | Tischer |
| 2003/0131005 A1 | 7/2003 | Berry |
| 2003/0147267 A1 | 8/2003 | Huttunen |
| 2003/0158839 A1 | 8/2003 | Faybishenko |
| 2003/0191799 A1 | 10/2003 | Araujo et al. |
| 2003/0196087 A1 | 10/2003 | Stringer et al. |
| 2003/0223624 A1 | 12/2003 | Hamid |

(56) References Cited

U.S. PATENT DOCUMENTS

| | | |
|---|---|---|
| 2003/0233419 A1 | 12/2003 | Beringer |
| 2003/0237047 A1 | 12/2003 | Borson |
| 2004/0002049 A1 | 1/2004 | Beavers et al. |
| 2004/0031052 A1 | 2/2004 | Wannamaker et al. |
| 2004/0122659 A1 | 6/2004 | Hourihane et al. |
| 2004/0186851 A1 | 9/2004 | Jhingan et al. |
| 2004/0187076 A1 | 9/2004 | Ki |
| 2004/0261016 A1 | 12/2004 | Glass et al. |
| 2005/0021637 A1* | 1/2005 | Cox ............................ 709/206 |
| 2005/0027704 A1 | 2/2005 | Hammond et al. |
| 2005/0055306 A1* | 3/2005 | Miller .................. G06Q 40/04 705/37 |
| 2005/0071755 A1 | 3/2005 | Harrington et al. |
| 2005/0086525 A1* | 4/2005 | Cirulli et al. ................. 713/201 |
| 2005/0138540 A1 | 6/2005 | Baltus et al. |
| 2005/0251748 A1 | 11/2005 | Gusmorino et al. |
| 2006/0005247 A1 | 1/2006 | Zhang et al. |
| 2006/0013393 A1 | 1/2006 | Ferchichi et al. |
| 2006/0020520 A1* | 1/2006 | Lange et al. .................... 705/26 |
| 2006/0021031 A1 | 1/2006 | Leahy et al. |
| 2006/0059196 A1 | 3/2006 | Sato et al. |
| 2006/0064717 A1 | 3/2006 | Shibata et al. |
| 2006/0067578 A1 | 3/2006 | Fuse |
| 2006/0069605 A1* | 3/2006 | Hatoun ............................ 705/9 |
| 2006/0069740 A1 | 3/2006 | Ando |
| 2006/0112120 A1 | 5/2006 | Rohall |
| 2006/0129592 A1* | 6/2006 | Poozhiyil et al. ............. 707/102 |
| 2006/0129627 A1 | 6/2006 | Phillips |
| 2006/0171588 A1 | 8/2006 | Chellapilla et al. |
| 2006/0184505 A1 | 8/2006 | Kedem |
| 2006/0190493 A1 | 8/2006 | Kawai et al. |
| 2006/0218004 A1 | 9/2006 | Dworkin et al. |
| 2006/0218643 A1 | 9/2006 | DeYoung |
| 2006/0224589 A1 | 10/2006 | Rowney |
| 2006/0236246 A1 | 10/2006 | Bono et al. |
| 2006/0259524 A1 | 11/2006 | Horton |
| 2006/0259949 A1 | 11/2006 | Schaefer et al. |
| 2006/0261112 A1 | 11/2006 | Gates et al. |
| 2006/0271947 A1 | 11/2006 | Lienhart et al. |
| 2006/0272024 A1 | 11/2006 | Huang et al. |
| 2006/0294468 A1 | 12/2006 | Sareen et al. |
| 2006/0294469 A1 | 12/2006 | Sareen et al. |
| 2007/0005589 A1 | 1/2007 | Gollapudi |
| 2007/0011211 A1 | 1/2007 | Reeves |
| 2007/0025265 A1 | 2/2007 | Porras et al. |
| 2007/0027830 A1 | 2/2007 | Simons et al. |
| 2007/0100991 A1 | 5/2007 | Daniels et al. |
| 2007/0112854 A1* | 5/2007 | Franca ........................ 707/104.1 |
| 2007/0112930 A1 | 5/2007 | Foo et al. |
| 2007/0118598 A1 | 5/2007 | Bedi et al. |
| 2007/0141641 A1 | 6/2007 | Fang |
| 2007/0156785 A1 | 7/2007 | Hines et al. |
| 2007/0179967 A1 | 8/2007 | Zhang |
| 2007/0192728 A1 | 8/2007 | Finley et al. |
| 2007/0220068 A1 | 9/2007 | Thompson et al. |
| 2007/0261112 A1 | 11/2007 | Todd et al. |
| 2007/0294318 A1 | 12/2007 | Arora et al. |
| 2007/0294612 A1 | 12/2007 | Drucker et al. |
| 2008/0028017 A1* | 1/2008 | Garbow et al. ............... 709/201 |
| 2008/0033913 A1 | 2/2008 | Winburn |
| 2008/0040388 A1 | 2/2008 | Petri et al. |
| 2008/0046518 A1* | 2/2008 | Tonnison et al. ............. 709/206 |
| 2008/0080515 A1 | 4/2008 | Tombroff |
| 2008/0082529 A1 | 4/2008 | Mantena et al. |
| 2008/0082930 A1 | 4/2008 | Omernick et al. |
| 2008/0094370 A1 | 4/2008 | Ording et al. |
| 2008/0177782 A1 | 7/2008 | Poston et al. |
| 2008/0178076 A1 | 7/2008 | Kritt et al. |
| 2008/0209001 A1* | 8/2008 | Boyle .................. G06Q 10/107 709/207 |
| 2008/0219495 A1 | 9/2008 | Hulten et al. |
| 2008/0235760 A1 | 9/2008 | Broussard et al. |
| 2008/0263363 A1 | 10/2008 | Jueneman et al. |
| 2008/0306894 A1* | 12/2008 | Rajkumar .......... G06Q 10/0637 706/47 |
| 2008/0310624 A1 | 12/2008 | Celikkan |
| 2008/0320316 A1 | 12/2008 | Waldspurger |
| 2009/0019051 A1* | 1/2009 | Winburn ........................... 707/9 |
| 2009/0030997 A1 | 1/2009 | Malik |
| 2009/0034804 A1 | 2/2009 | Cho et al. |
| 2009/0037520 A1* | 2/2009 | Loffredo ....................... 709/203 |
| 2009/0052778 A1 | 2/2009 | Edgecomb et al. |
| 2009/0064326 A1 | 3/2009 | Goldstein |
| 2009/0070128 A1 | 3/2009 | McCauley et al. |
| 2009/0083384 A1 | 3/2009 | Bhogal et al. |
| 2009/0094530 A1* | 4/2009 | Champlain et al. .......... 715/752 |
| 2009/0129002 A1 | 5/2009 | Wu et al. |
| 2009/0164427 A1 | 6/2009 | Shields et al. |
| 2009/0177754 A1 | 7/2009 | Brezina et al. |
| 2009/0183257 A1 | 7/2009 | Prahalad |
| 2009/0216843 A1 | 8/2009 | Willner et al. |
| 2009/0222450 A1 | 9/2009 | Zigelman |
| 2009/0234863 A1 | 9/2009 | Evans |
| 2009/0235706 A1 | 9/2009 | Broussard et al. |
| 2009/0241187 A1 | 9/2009 | Troyansky |
| 2009/0271620 A1 | 10/2009 | Sudhakar |
| 2010/0011077 A1 | 1/2010 | Shkolnikov et al. |
| 2010/0011428 A1 | 1/2010 | Atwood et al. |
| 2010/0017404 A1 | 1/2010 | Banerjee et al. |
| 2010/0017478 A1* | 1/2010 | Mejia et al. .................. 709/206 |
| 2010/0049807 A1 | 2/2010 | Thompson |
| 2010/0064004 A1 | 3/2010 | Ravi et al. |
| 2010/0064372 A1 | 3/2010 | More |
| 2010/0070448 A1 | 3/2010 | Omoigui |
| 2010/0076985 A1 | 3/2010 | Egnor |
| 2010/0114985 A1 | 5/2010 | Chaudhary et al. |
| 2010/0114991 A1 | 5/2010 | Chaudhary et al. |
| 2010/0124354 A1 | 5/2010 | More |
| 2010/0146382 A1 | 6/2010 | Abe et al. |
| 2010/0174761 A1 | 7/2010 | Longobardi et al. |
| 2010/0217987 A1 | 8/2010 | Shevade |
| 2010/0251104 A1 | 9/2010 | Massand |
| 2010/0257352 A1 | 10/2010 | Errico |
| 2010/0287246 A1 | 11/2010 | Klos et al. |
| 2010/0299727 A1 | 11/2010 | More et al. |
| 2010/0332428 A1 | 12/2010 | McHenry et al. |
| 2010/0332682 A1 | 12/2010 | Sharp et al. |
| 2011/0029625 A1 | 2/2011 | Cheng et al. |
| 2011/0107106 A1 | 5/2011 | Morii et al. |
| 2011/0141521 A1 | 6/2011 | Qiao |
| 2011/0145229 A1 | 6/2011 | Vailaya et al. |
| 2011/0154180 A1* | 6/2011 | Evanitsky et al. ............. 715/233 |
| 2011/0276658 A1 | 11/2011 | Massand |
| 2011/0283177 A1* | 11/2011 | Gates et al. .................. 715/224 |
| 2012/0011361 A1 | 1/2012 | Guerrero et al. |
| 2012/0016867 A1 | 1/2012 | Clemm et al. |
| 2012/0079267 A1 | 3/2012 | Lee |
| 2012/0110092 A1 | 5/2012 | Keohane et al. |
| 2012/0131635 A1 | 5/2012 | Huapaya |
| 2012/0133989 A1 | 5/2012 | Glover |
| 2012/0136951 A1 | 5/2012 | Mulder |
| 2012/0136952 A1 | 5/2012 | Mulder |
| 2012/0173881 A1 | 7/2012 | Trotter |
| 2012/0260188 A1* | 10/2012 | Park ..................... G06Q 10/107 715/739 |
| 2012/0265817 A1 | 10/2012 | Vidalenc et al. |
| 2012/0317414 A1 | 12/2012 | Glover |
| 2012/0317479 A1 | 12/2012 | Safa |
| 2013/0074195 A1 | 3/2013 | Johnston et al. |
| 2013/0074198 A1 | 3/2013 | More |
| 2013/0097421 A1 | 4/2013 | Lim |
| 2013/0246901 A1 | 9/2013 | Massand |
| 2013/0254536 A1 | 9/2013 | Glover |
| 2013/0290867 A1 | 10/2013 | Massand |
| 2014/0115066 A1 | 4/2014 | Massand |
| 2014/0115436 A1 | 4/2014 | Beaver et al. |
| 2014/0279843 A1 | 9/2014 | Von Weihe |
| 2014/0281872 A1 | 9/2014 | Glover |
| 2015/0033283 A1 | 1/2015 | Mulder |

FOREIGN PATENT DOCUMENTS

| | | |
|---|---|---|
| JP | 2007299364 | 11/2007 |
| KR | 1020010078840 | 8/2001 |

(56) References Cited

FOREIGN PATENT DOCUMENTS

| KR | 1020040047413 | 6/2004 |
|---|---|---|
| KR | 1020060048686 | 5/2006 |
| KR | 1020070049518 | 5/2007 |
| KR | 1020080029602 | 4/2008 |
| WO | 0060504 | 10/2000 |
| WO | 0152473 | 7/2001 |
| WO | 02101577 | 12/2002 |

OTHER PUBLICATIONS

Howard, Pamela O. Prototype Message Dissemination System and Document Routing System for an Army Organization. Arizona Univ Tucson, 1990; pp. 7-9.*
Cox et al; Microsoft Office Word 2007 Step by Step; Jan. 17, 2007; Microsoft Press; pp. 283-293.
Non-Final Office Action mailed Dec. 6, 2012 in co-pending U.S. Appl. No. 13/306,798, filed Nov. 29, 2011.
Restriction Requirement Jun. 30, 2006 for U.S. Appl. No. 10/136,733, filed Apr. 30, 2002.
Stephen Voida et al., Share and Share Alike: Exploring the User Interface Affordances of File Sharing, Apr. 22-27, 2006, ACM, pp. 1-10.
Dominik Grolmund et al., Cryptree: A Folder Tree Structure for Cryptographic File Systems, Oct. 2-4, 2006, IEEE, pp. 189-198.
Nathanial S. Good et al., Usability and privacy: a study of KaZaA P2P file-sharing, Apr. 5-10, 2003, ACM, vol. No. 5, Issue No. 1, pp. 137-144.
M. Eric Johnson et al., The Evolution of the Peer-to-Peer File Sharing Industry and the Security Risks for Users, Jan. 7-10, 2008, IEEE, pp. 1-10.
Weiss et al., Lightweight document matching for help-desk applications, In; Intelligent Systems and their Applications, IEEE, Vo. 15, Issue:2, pp. 57-61, ISSN 1094-7167, 2000.
PC Magazine "Pure Intranets: Real-Time Internet Collboration", http://www.zdnet.com/pcmag/featuresgroupware/gpwst.htm, Aug. 30, 2001, 2 pages.
Wells et al., "Groupware & Collaboration Support", www.objs.com/survey/groupwar.htm, Aug. 30, 2001, 10 pages.
Tsai, et al., "A Document Workspace for Collaboration and Annotation based on XML Technology", IEEE, 2000, pp. 165-172.
Roussev, et al., "Integrating XML and Object-based Programming for Distributed Collaboration", IEEE, 2000, pp. 254-259.
XP-002257904, "Workshare Debuts Synergy", 2003, 3 pages.
Microsoft, "Microsoft XP, Product Guide", Aug. 24, 2001, pp. 1-26, Microsoft.
Monga, et al., "Perceptual Image Hashing via Feature Points: Performance Evaluation and Tradeoffs," IEEE Transactions on Image Processing, vol. 15, No. 11, Nov. 2006, pp. 3453-3466.
Monga, "Robust Perceptual Image Hashing Using Feature Points," http://bluecoat-o2/?cfru=aHR0cDovL3NpZ25hbC51Y2UudXrle GFzLmVkdS9+dmIzaGFsL2hhc2gtcGFydEkucHM=, 2003.
Tulyakov, et al., "Symmetric Hash Functions for Fingerprint Minutiae," International Workshop on Pattern Recognition for Crime Prevention, Security and Surveillance, Bath U.K., Oct. 2, 2005, pp. 30-38.
Xuefeng Liang; et al., "Fingerprint Matching Using Minutia Polygons," Pattern Recognition, 2006, ICPR 2006, 18th International Conference on, vol. 1, No., pp. 1046-1049.
Sujoy Roy, et al., "Robust Hash for Detecting and Localizing Image Tampering," Image Processing, 2007, ICIP 2007, IEEE International Conference on, vol. 6, No., pp. V1-117-V1-120, Sep. 16, 2007-Oct. 19, 2007.
Yung, et al., "Generating Robust Digital Signature for Image/Video Authentication," Multimedia and Security Workshop at ACM Multimedia '98, Bristol, U.K., Sep. 1998.
International Search Report of PCT Application No. PCT/US2009/056651, Dated Apr. 21, 2010, pp. 1-3.

International Search Report of PCT Application No. PCT/US2009/065019 dated Jun. 4, 2010, pp. 1-6.
International Search Report of PCT Application No. PCT/US2009/056668 dated Apr. 16, 2010, pp. 1-9.
International Search Report of PCT Application No. PCT/US2009/051313, Mar. 3, 2010, 3 pages.
International Search Report of PCT Application No. PCT/US2009/064919 dated Jul. 1, 2010, pp. 1-3.
International Search Report of PCT Application No. PCT/US2010/043345, Apr. 28, 2011, 3 pages.
International Search Report of PCT Application No. PCT/IB2002/005821, Jan. 3, 2004, 6 pages.
Written Opinion PCT Application No. PCT/US2009/056651, Dated Apr. 21, 2010, pp. 1-5.
Written Opinion PCT Application No. PCT/US2009/065019 dated Jun. 4, 2010, pp. 1-5.
Written Opinion PCT Application No. PCT/US2009/056668 dated Apr. 16, 2010, pp. 1-4.
Written Opinion of PCT Application No. PCT/US2009/051313, Mar. 3, 2010, 4 pages.
Written Opinion PCT Application No. PCT/US2009/064919 dated Jul. 1, 2010, pp. 1-4.
Written Opinion PCT Application No. PCT/US2010/043345 dated Apr. 28, 2011, 4 pages.
Advisory Action mailed Apr. 12, 2013, in Co-Pending U.S. Appl. No. 12/621,429 by More, S., filed Nov. 18, 2009.
Advisory Action Mailed Nov. 1, 2013, in Co-Pending U.S. Appl. No. 13/659,793 by More, S., filed Oct. 24, 2012.
Restriction Requirement Mailed Feb. 14, 2005 for U.S. Appl. No. 10/023,010, filed Dec. 17, 2001, Issued U.S. Pat. No. 7,496,841.
Non-Final Office Action Mailed Jan. 9, 2012 in Co-Pending U.S. Appl. No. 12/177,043, filed Jul. 21, 2008.
Non-Final Office Action Mailed Mar. 11, 2011, in Co-pending U.S. Appl. No. 12/209,096, filed Sep. 11, 2008.
Restriction Requirement Mailed Feb. 5, 2008 for U.S. Appl. No. 10/023,010, filed Dec. 17, 2001, Issued U.S. Pat. No. 7,496,841.
Notice of Allowance Mailed Jul. 8, 2013 in Co-Pending U.S. Appl. No. 12/209,082 by S. More et al. filed Sep. 11, 2008.
Notice of Allowance Mailed Oct. 24, 2008 in Co-pending U.S. Appl. No. 10/023,010, filed Dec. 17, 2001.
Notice of Allowance Mailed Oct. 2, 2012 in Co-Pending U.S. Appl. No. 12/275,185 by More, S., filed Nov. 20, 2008.
Notice of Allowance Mailed Mar. 13, 2013 in Co-Pending U.S. Appl. No. 12/844,818 by Glover, R., filed Jul. 27, 2010.
Notice of Allowance Mailed Aug. 19, 2012 in Co-Pending U.S. Appl. No. 12/177,043, filed Jul. 21, 2008.
Notice of Allowance Mailed Jun. 26, 2012 in Co-Pending U.S. Appl. No. 12/275,185, filed Nov. 20, 2008.
Notice of Allowance Mailed Sep. 25, 2013 in Co-Pending U.S. Appl. No. 13/659,817 by More, S., filed Oct. 24, 2012.
Non-Final Office Action mailed Aug. 13, 2013 in co-pending U.S. Appl. No. 13/306,819 by Glover, R.W., filed Nov. 29, 2011.
Non-Final Office Action Mailed Sep. 19, 2011 for U.S. Appl. No. 12/177,043, filed Jul. 21, 2008.
Final Office Action mailed Aug. 16, 2013 in co-pending U.S. Appl. No. 13/306,798 of Glover, R.W., filed Nov. 29, 2011.
Non-Final Office Action mailed May 17, 2013 in co-pending U.S. Appl. 13/306,765 by Mulder, S.P.M., filed Nov. 29, 2011.
Final Office Action Mailed Feb. 1, 2013 in Co-Pending U.S. Appl. No. 12/621,429 by More, S., filed Nov. 18, 2009.
Final Office Action Mailed May 10, 2012 in Co-Pending U.S. Appl. No. 12/209,082, filed Sep. 11, 2008.
Final Office Action Mailed Apr. 16, 2012 in Co-Pending U.S. Appl. No. 12/177,043, filed Jul. 21, 2008.
Final Office Action mailed Aug. 12, 2011 for U.S. Appl. No. 12/209,096, filed Sep. 11, 2008.
Final Office Action Mailed Apr. 17, 2007 for U.S. Appl. No. 10/023,010, filed Dec. 17, 2001, Issued U.S. Pat. No. 7,496,841.
Non-Final Office Action Mailed May 7, 2008 in Co-Pending U.S. Appl. No. 10/023,010, filed Dec. 17, 2001, Issued Patent No. 7,496,841.
Non-Final Office Action Mailed Apr. 26, 2013 in Co-Pending U.S. Appl. No. 13/659,817 by More, S., filed Oct. 24, 2012.

(56) References Cited

OTHER PUBLICATIONS

Non-Final Office Action Mailed Sep. 19, 2012 in Co-Pending U.S. Appl. No. 12/844,818 by Glover, R., filed Jul. 27, 2010.
Non-Final Office Action Mailed Apr. 27, 2012 in Co-Pending U.S. Appl. No. 12/275,185, filed Nov. 20, 2008.
Non-Final Office Action Mailed Mar. 18, 2013 in Co-Pending U.S. Appl. No. 13/659,793 by More, S., filed Oct. 24, 2012.
Non-Final Office Action Mailed Mar. 20, 2006 in Co-pending U.S. Appl. No. 10/136,733, filed Apr. 30, 2002.
Non-Final Office Action Mailed Mar. 16, 2006 for U.S. Appl. No. 10/023,010, filed Dec. 17, 2001, Issued U.S. Pat. No. 7,496,841.
Final Office Action Mailed Oct. 21, 2013, in Co-Pending U.S. Appl. No. 13/659,793 by More, S., filed Oct. 24, 2012.
Final Office Action Mailed Jan. 18, 2013 in Co-Pending U.S. Appl. No. 12/844,818 by Glover, R., filed Jul. 27, 2010.
Non-final office action issued for U.S. Appl. No. 13/799,067 on Oct. 30, 2014.
Non-Final Office Action Mailed Aug. 1, 2012 in Co-Pending U.S. Appl. No. 12/621,429, filed Nov. 18, 2009.
Non-Final Office Action Mailed Dec. 22, 2011 in Co-Pending U.S. Appl. No. 12/209,082, filed Sep. 11, 2008.

\* cited by examiner

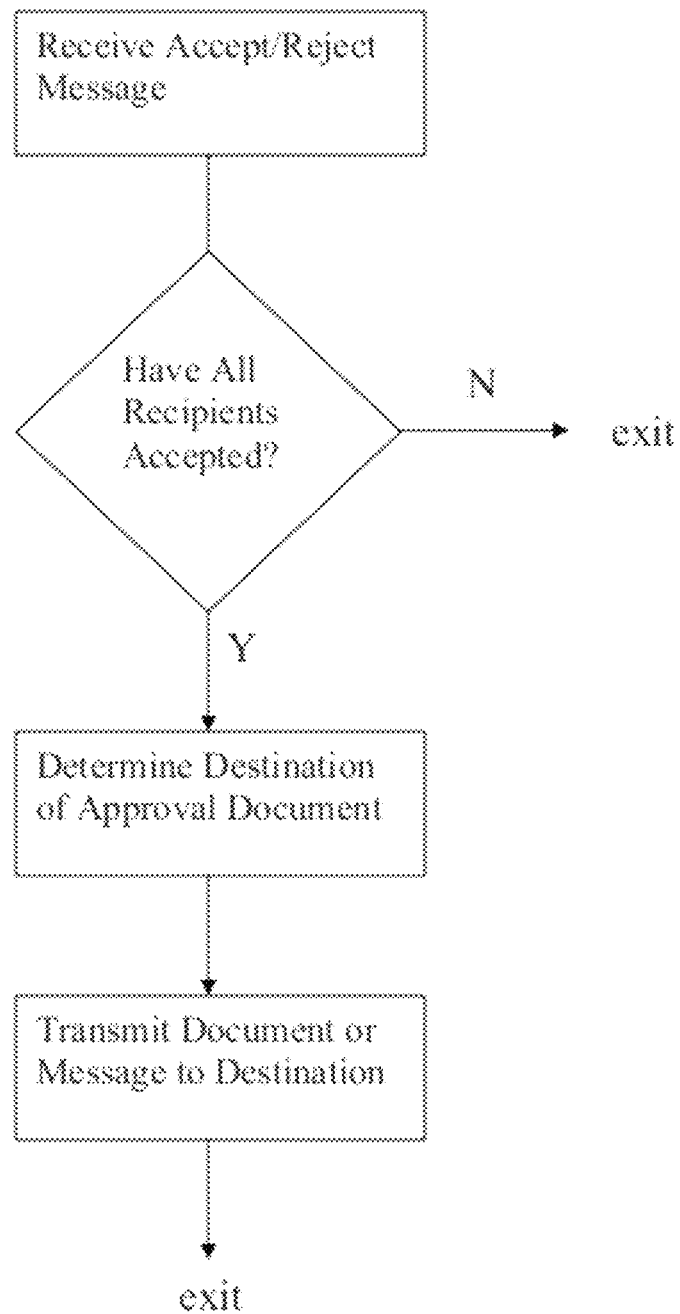

METHOD AND SYSTEM FOR SHARED DOCUMENT APPROVAL

This application claims priority as a non-provisional continuation of U.S. Patent Application No. 61/496,904 filed on Jun. 14, 2011.

FIELD OF INVENTION

This invention provides a mechanism whereby a group of people operating individual computer devices can view and approve an electronic document.

BACKGROUND

Electronic documents, for example text documents, are often subject to approval by more than one authorized viewer. There is a need for a method and system of group approval of an electronic document whereby the user interface of the computer program permits better control of the group approval process by its participants.

DESCRIPTION OF THE FIGURES

1. Approval Dialogue Box.
2. Flow Chart for Document Distribution
3. Flow Chart for Recipient List Generation
4. Flow Chart for Display of Approval Dialogue Box
5. Flow Chart for Document Approval Completion

DETAILED DESCRIPTION OF THE PREFERRED EMBODIMENTS

Figure 1:
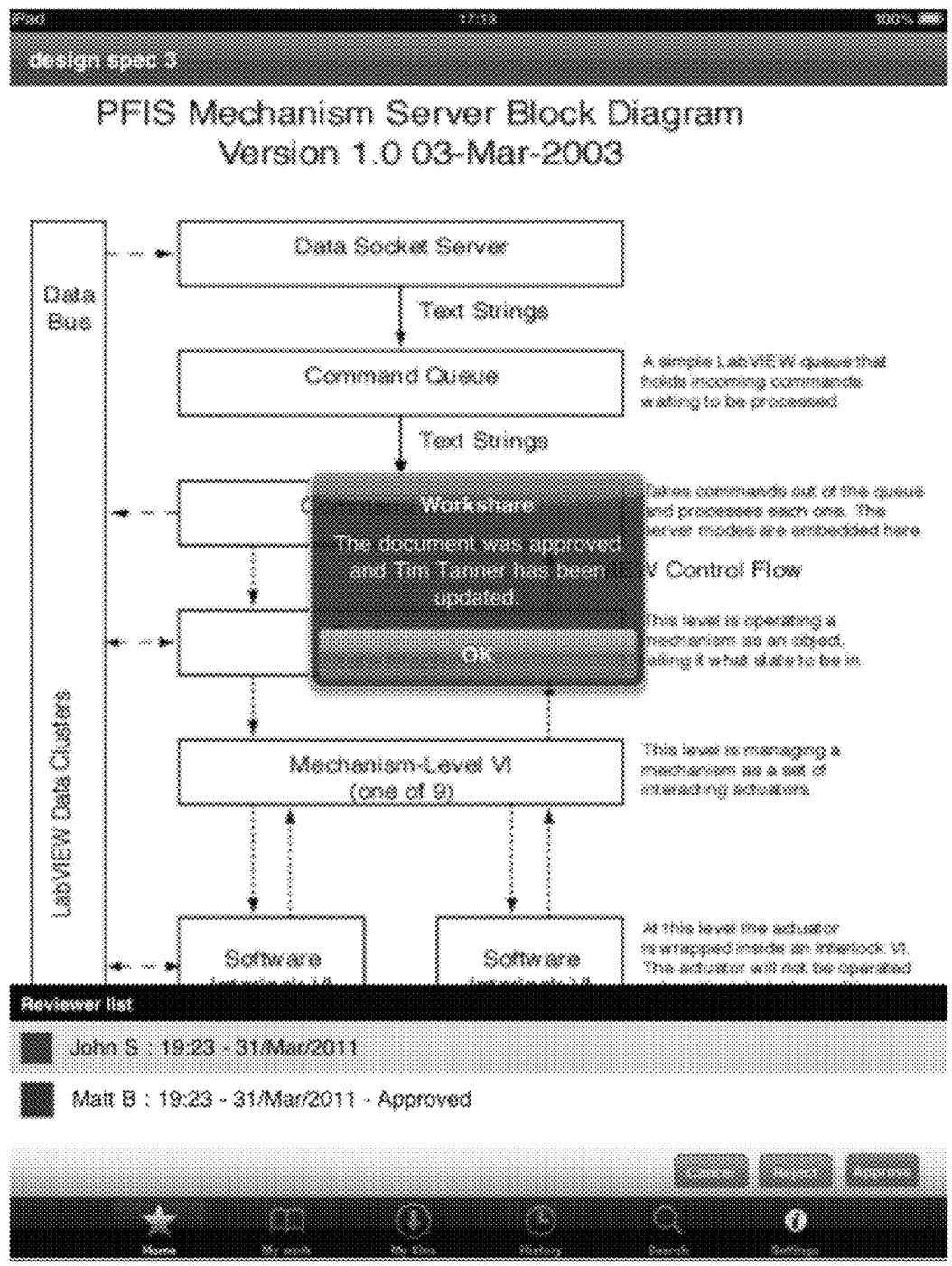
Figure 2:
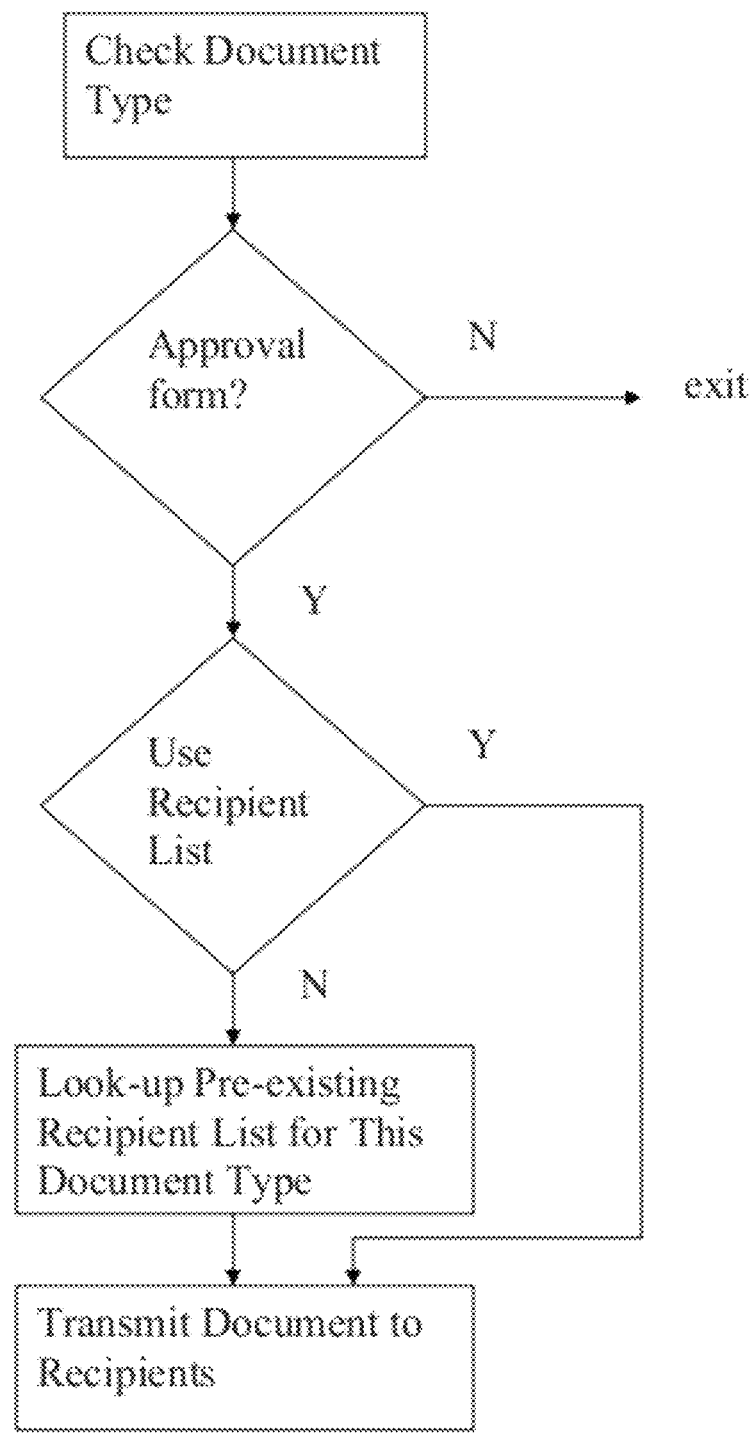
Figure 3:
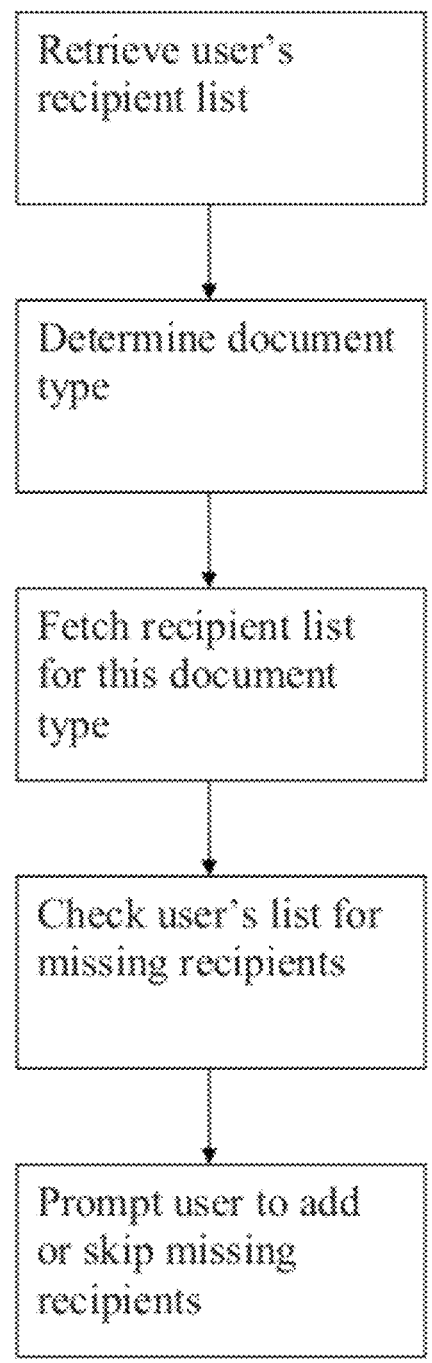
Figure 4:
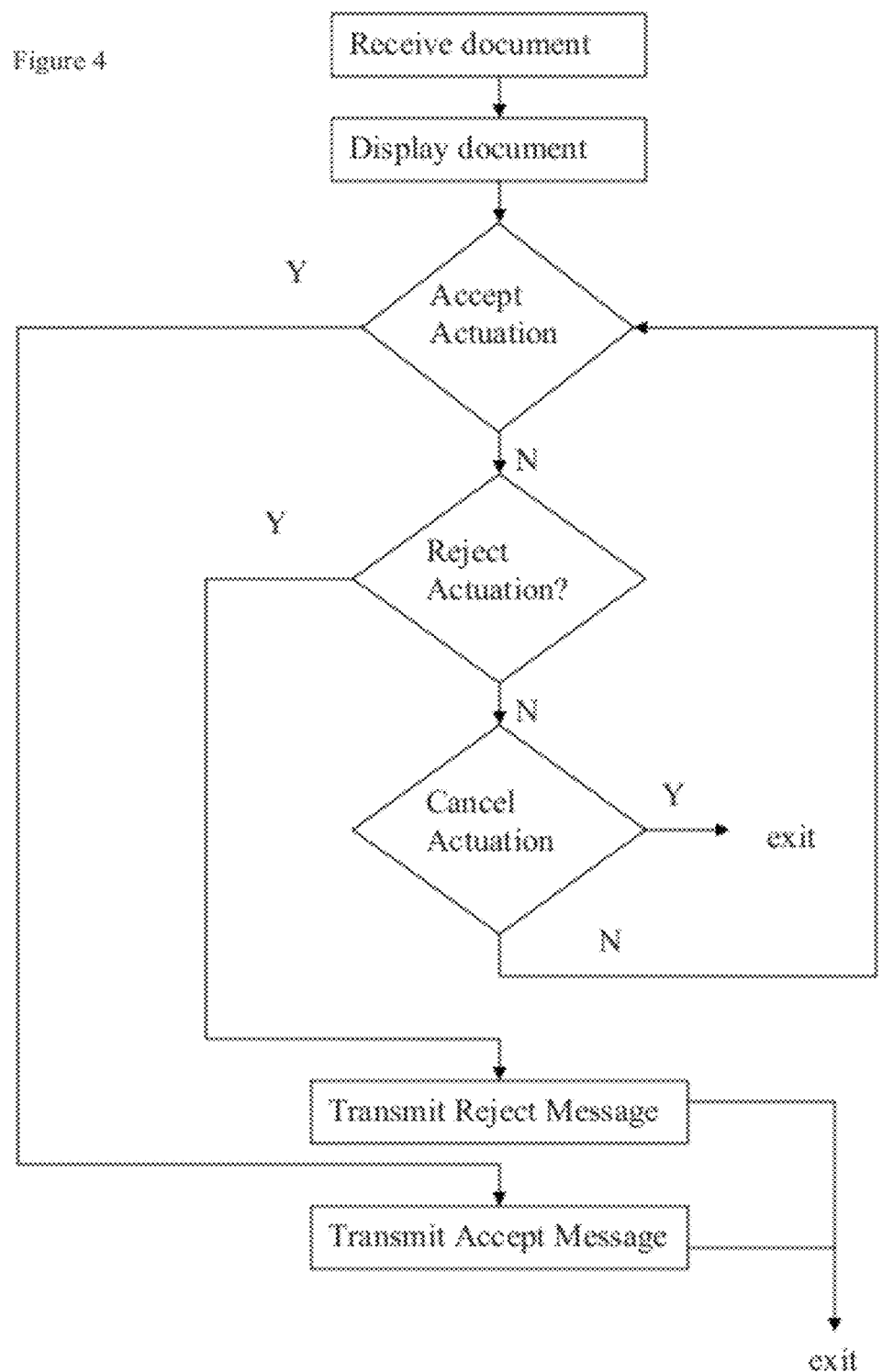

The method and system operates on one or more computers, typically using a server and one or more remote user's computing devices. A customer's device can be a personal computer, mobile phone, mobile handheld device like a Blackberry™ or iPhone™ or a tablet device like the iPad™ or Galaxy™ or any other kind of computing device a user can use to view and edit an electronic document. The user devices are operatively connected to the remote server using a data network. The invention does not require that the data network be in continuous contact with the remote file server. The invention works with document management and editing systems. An example of a document editing system is presented by U.S. patent application Ser. No. 13/155,900 filed on Jun. 8, 2011, which is hereby incorporated by reference.

In one embodiment of the invention, an originator creates an electronic document that requires approval. For example, the originator who is a worker in an organization may create on their computer a vacation request that has to be approved by several people in management. The electronic document can be created on the originator's device. The invention then opens a dialogue box that is displayed on the originator's computer screen where the originator inputs the identity of the personnel that are to approve the document (referred to as the "recipient list'). The document then contains metadata that indicates the type of document that it is as well as the identity of the originator. In another embodiment, the invention operating on either the originator's device or the server checks the document to see if the metadata contained in the document shows that it is a document subject to approval. Examples would include (without limiting the breadth of the invention) a expense report, a vacation request or similar internal corporate document detailing an action that requires approval. That metadata can also indicate the type of document, for example, distinguishing between a vacation request and an expense approval. If the document is subject to an approval, the invention then distributes the document to the list of recipients included in the metadata.

In yet another embodiment, the invention will use the type of document that is specified by the metadata to query a database to find a list of recipients that are specified as personnel that are to approve (or not approve) the document. For example, there may be a database comprised of one list of recipients for vacation requests made by that originator and another for approving expense reimbursement.

In another embodiment of the invention, the originator of the document can receive a list of pre-determined recipients that were not cited by the originator when the document was created. In this embodiment, the originator can select which of these missing recipients should be added to the recipient list. This information is then stored as metadata in the document. The document is then transmitted up to the server. On the server, the metadata is checked and action is taken in response to the metadata.

In yet another embodiment, the invention can delete from the recipient list destination addresses that are not part of the pre-determined recipient list that the invention has fetched from storage as the list associated with that type of document. In yet another embodiment, the invention can scan a database of documents to seek out similar documents. Then the invention can compile a list of recipients from the set of recipients that received one or more of those similar documents. The system can apply further logic, for example, deleting from that set those persons who are not currently listed as employees of the company. The resulting recipient list may be used or presented to the originator to selectively supplement the originator's list of recipients.

Once the recipient list has been finally determined, the system then transmits the document to the list of recipients or a message that such a document is pending the recipient's approval. The document stored on the remote server is downloaded into each recipient's device. When the downloaded document is displayed on the recipient's device, the device utilizes the system. The system causes the identity of the recipient list to be displayed at the bottom of the screen in a dialogue box. If other recipients have inserted comments into the document, the dialogue box can indicate the presence of comments. If the other recipients have approved or rejected the document, the approval or rejection of each recipient can be shown by means of a visual indication in the dialogue box.

In yet another embodiment, the system will analyze the text of the document directly to determine whether or not an approval was required and which recipient list would apply. For example, the heading of a document might include the title "Vacation Request". Text matching logic can determine that the document is a vacation request form. By means of automated content analysis of the document, the type of document can be determined to some pre determined adequate level of accuracy.

The document subject to approval is transmitted to the recipients on the recipient list. The recipient list may be a list of email addresses or other network locations. In another embodiment, the recipient list is a list of identifiers that the system can associate with corresponding network destinations. The recipient's computer receives the document and determines by examining the metadata that the document is subject to approval. The application running on the recipient's computer opens a dialogue box that displays the identity of the other recipients that are to give approval. (See FIG. 1). The application can transmit a request to a server to obtain the approval status of the document for those other recipients. The application then updates the display to show the approval status of the document. The application then detects whether the recipient has actuated any of the buttons displayed on the user interface. In one embodiment, there are three buttons: approve, reject and cancel. When approve or reject are selected, the document metadata is updated with the approve or reject, respectively. The document is then transmitted back to the server in order to update the document database.

In another embodiment, the application running on the recipient's computer transmits a data message to the server indicating the identity of the document, the identity of the recipient and whether the recipient has approved or rejected the document. The server component of the system can then update the document directly, as well as transmit this status information to the other recipients' computers and the originator's computer.

In yet another embodiment, the invention can cause a message to be sent to the originator each time a member of the recipient list inputs an "Approve" or "Reject" command into the dialogue box displayed on their computer. In this way, the originator can track the progress of the document through the approval process. The originator can also fetch the document to see comments that have been inserted into the document.

The system contains data storage that is comprised of data including network addresses associated with the originator or recipients, for example, an email address, a telephone number, Twitter™ handle or any other designation of an electronic message destination. This data may be stored on the server or on the user devices. When a recipient list is determined, the actual network addresses are looked up and used to transmit the message. When the "approve" or "reject" button is actuated, the system composes an electronic message that is then transmitted to the destination associated with the originator, in another embodiment, the message is transmitted to the destinations associated with all of the members of the recipient list and the originator, respectively. The message is a data object that is transmitted to the destination or destinations. The program logic causes the system to fetch from storage the destination data associated with the originator of the document. Then the program assembles the data object using content and the destination data. The content of the message can be comprised of a reference to the document and the identity of the recipient in the form of text data. In yet another embodiment, the system can cause a dialogue box to open permitting the recipient to type in a question or comment that is included with the message data object as text data. In yet another embodiment, the device can open a dialogue box that permits the recipient to record their voice input or voice together with video input as a recording of the recipient reciting a question or a comment. This audio or audio visual data is then transmitted as part of the content of the message data object, thus alleviating the need for the reviewer to type text data into the message.

When the document has all members of the recipient list set to "Approve", the invention then transmits the document back to the originator. In another embodiment, an electronic message indicating completed approval is transmitted to the originator. In yet another embodiment, the document itself contains metadata that indicates where the document should go when approval is completed. The destination may be determined by using the type of document. For example, an expense reimbursement report may contain metadata indicating an email address of the accounts payable department. When the system determines that the expense report document has been approved by all the recipients, it automatically routes it to the appropriate recipient at the accounts payable department. Because personnel can change and therefore email addresses, another embodiment of the invention involves having a final recipient associated with a type of document. In this case, the document does not carry the identity of the final recipient, rather, the invention determines that destination address by looking up in a database the destination address. The database would contain a mapping of document types to final recipient addresses. This may be carried to another level in the database, so that an "expense report" is mapped to "accounts payable", and then "accounts payable" mapped to a particular individual. That way, if the individual changes, the mapping of the expense report does not need to be changed, only the mapping of "accounts payable" to the individual's network address.

Operating Environment:

The user's computer may be a laptop, desktop type of personal computer. It can also be a cell phone, smart phone or other handheld device, including a tablet. The precise form factor of the user's computer does not limit the claimed invention. Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The system and method described herein can be executed using a computer system, generally comprised of a central processing unit (CPU) that is operatively connected to a memory device, data input and output circuitry (I/O) and computer data network communication circuitry. A video display device may be operatively connected through the I/O circuitry to the CPU. Components that are operatively connected to the CPU using the I/O circuitry include microphones, for digitally recording sound, and video camera, for digitally recording images or video. Audio and video may be recorded simultaneously as an audio visual recording. The I/O circuitry can also be operatively connected to an audio loudspeaker in order to render digital audio data into audible sound. Audio and video may be rendered through the loudspeaker and display device separately or in combination. Computer code executed by the CPU can take data received by the data communication circuitry and store it in the memory device. In addition, the CPU can take data from the I/O circuitry and store it in the memory device. Further, the CPU can take data from a memory device and output it through the I/O circuitry or the data communication circuitry. The data stored in memory may be further recalled from the memory device, further processed or modified by the CPU in the manner described herein and restored in the same memory device or a different memory device operatively connected to the CPU including by means of the data network circuitry. The memory device can be any kind of data storage circuit or magnetic storage or optical device, including a hard disk, optical disk or solid state memory.

The computer can display on the display screen operatively connected to the I/O circuitry the appearance of a user interface. Various shapes, text and other graphical forms are displayed on the screen as a result of the computer generating data that causes the pixels comprising the display screen to take on various colors and shades. The user interface also displays a graphical object referred to in the art as a cursor. The object's location on the display indicates to the user a selection of another object on the screen. The cursor may be moved by the user by means of another device connected by I/O circuitry to the computer. This device detects certain physical motions of the user, for example, the position of the hand on a flat surface or the position of a finger on a flat surface. Such devices may be referred to in the art as a mouse or a track pad. In some embodiments, the display screen itself can act as a trackpad by sensing the presence and position of one or more fingers on the surface of the display screen. When the cursor is located over a graphical object that appears to be a button or switch, the user can actuate the button or switch by engaging a physical switch on the mouse or trackpad or computer device or tapping the trackpad or touch sensitive display. When the computer detects that the physical switch has been engaged (or that the tapping of the track pad or touch sensitive screen has occurred), it takes the apparent location of the cursor (or in the case of a touch sensitive screen, the detected position of the finger) on the screen and executes the process associated with that location. As an example, not intended to limit the breadth of the disclosed invention, a graphical object that appears to be a 2 dimensional box with the word "enter" within it may be displayed on the screen. If the computer detects that the switch has been engaged while the cursor location (or finger location for a touch sensitive screen) was within the boundaries of a graphical object, for example, the displayed box, the computer will execute the process associated with the "enter" command. In this way, graphical objects on the screen create a user interface that permits the user to control the processes operating on the computer.

The system is typically comprised of a central server that is connected by a data network to a user's computer. The central server may be comprised of one or more computers connected to one or more mass storage devices. The precise architecture of the central server does not limit the claimed invention. In addition, the data network may operate with several levels, such that the user's computer is connected through a fire wall to one server, which routes communications to another server that executes the disclosed methods. The precise details of the data network architecture does not limit the claimed invention.

A server may be a computer comprised of a central processing unit with a mass storage device and a network connection. In addition a server can include multiple of such computers connected together with a data network or other data transfer connection, or, multiple computers on a network with network accessed storage, in a manner that provides such functionality as a group. Practitioners of ordinary skill will recognize that functions that are accomplished on one server may be partitioned and accomplished on multiple servers that are operatively connected by a computer network by means of appropriate inter process communication. In addition, the access of the website can be by means of an Internet browser accessing a secure or public page or by means of a client program running on a local computer that is connected over a computer network to the server. A data message and data upload or download can be delivered over the Internet using typical protocols, including TCP/IP, HTTP, SMTP, RPC, FTP or other kinds of data communication protocols that permit processes running on two remote computers to exchange information by means of digital network communication. As a result a data message can be a data packet transmitted from or received by a computer containing a destination network address, a destination process or application identifier, and data values that can be parsed at the destination computer located at the destination network address by the destination application in order that the relevant data values are extracted and used by the destination application.

The invention may also be practiced in distributed computing environments where tasks are performed by remote processing devices that are linked through a communications network. In a distributed computing environment, program modules may be located in both local and remote computer storage media including memory storage devices. Practitioners of ordinary skill will recognize that the invention may be executed on one or more computer processors that are linked using a data network, including, for example, the Internet. In another embodiment, different steps of the process can be executed by one or more computers and storage devices geographically separated by connected by a data network in a manner so that they operate together to execute the process steps. In one embodiment, a user's computer can run an application that causes the user's computer to transmit a stream of one or more data packets across a data network to a second computer, referred to here as a server. The server, in turn, may be connected to one or more mass data storage devices where the database is stored. The server can execute a program that receives the transmitted packet and interpret the transmitted data packets in order to extract database query information. The server can then execute the remaining steps of the invention by means of accessing the mass storage devices to derive the desired result of the query. Alternatively, the server can transmit the query information to another computer that is connected to the mass storage devices, and that computer can execute the invention to derive the desired result. The result can then be transmitted back to the user's computer by means of another stream of one or more data packets appropriately addressed to the user's computer.

Computer program logic implementing all or part of the functionality previously described herein may be embodied in various forms, including, but in no way limited to, a source code form, a computer executable form, and various intermediate forms (e.g., forms generated by an assembler, compiler, linker, or locator.) Source code may include a series of computer program instructions implemented in any of various programming languages (e.g., an object code, an assembly language, or a high-level language such as FORTRAN, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The invention may be described in the general context of computer-executable instructions, such as program modules, being executed by a computer. Generally, program modules include routines, programs, objects, components, data structures, etc., that perform particular tasks or implement particular abstract data types. The computer program and data may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed hard disk), an optical memory device a CD-ROM or DVD), a PC card (e.g., PCMCIA card), or other memory device. The computer program and data may be fixed in any form in a signal that is transmittable to a computer using any of various communication technologies, including, but in no way limited to, analog technologies, digital technologies, optical technologies, wireless technologies, networking technologies, and internetworking technologies. The computer program and data may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.) It is appreciated that any of the software components of the present invention may, if desired, be implemented in ROM (read-only memory) form. The software components may, generally, be implemented in hardware, if desired, using conventional techniques.

The described embodiments of the invention are intended to be exemplary and numerous variations and modifications will be apparent to those skilled in the art. All such variations and modifications are intended to be within the scope of the present invention as defined in the appended claims. Although the present invention has been described and illustrated in detail, it is to be clearly understood that the same is by way of illustration and example only, and is not to be taken by way of limitation. It is appreciated that various features of the invention which are, for clarity, described in the context of separate embodiments may also be provided in combination in a single embodiment. Conversely, various features of the invention which are, for brevity, described in the context of a single embodiment may also be provided separately or in any suitable combination. It is appreciated that the particular embodiment described in the specification is intended only to provide an extremely detailed disclosure of the present invention and is not intended to be limiting.

It should be noted that the flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Oftentimes, logic elements may be added, modified, omitted, performed in a different order, or implemented using different logic constructs (e.g., logic gates, looping primitives, conditional logic, and other logic constructs) without changing the overall results or otherwise departing from the true scope of the invention.

Modifications of the above disclosed apparatus and methods which fall within the scope of the invention will be readily apparent to those of ordinary skill in the art. Accordingly, while the present invention has been disclosed in connection with exemplary embodiments thereof, it should be understood that other embodiments may fall within the spirit and scope of the invention, as defined by the following claims.

What is claimed:

1. A method executed by a computer comprising a video display, of determining approval of an electronic document by one or more personnel comprising:
    Receiving data representing a first document type;
    Storing data representing a recipient list comprised of data representing members of the list;
    Storing a data structure representing an association between the received first document type and received the stored recipient list where said data structure is characterized by having a write access permission;
    Receiving a document data file, comprised of a document, from a remote computer operated by a user excluded from the write access permission;
    Extracting at least one data from the contents of the received document data file and using the extracted data to determine a second document type associated with the document comprising the received document data file by using text string matching;
    Selecting by use of the determined second document type the stored recipient list that corresponds to the first document type by determining using logic that the first document type is the same as the second document type;
    Retrieving the selected recipient list;
    Transmitting said received document data file to the members of the selected recipient list;
    Receiving at least one data message from at least one corresponding members of the selected recipient list, said received data message comprised of data representing the identity of the at least one of the recipients on the selected recipient list, an identity of the document comprising the received document data file and a data value representing an approval or a denial;
    Storing in a data record associated with the identity of the document comprising the document data file a data value representing the received data value.

2. The method of claim 1 further comprising:
    Determining the received document type extracting metadata embedded in the document.

3. The method of claim 1 further comprising:
    Receiving from a member of the recipient list a data message representing a comment and an identity of the document; and
    Determining an originator of the document by retrieving from a document management system a data value associated with a document identifier associated with the document; and
    Transmitting a data message comprising the comment to the originator.

4. The method of claim 1 further comprising:
    Transmitting to a computer associated with an originator of the document at least one data representing the identity of a recipient; and
    Receiving from said associated computer an approval of the transmitted recipient identity to be added to the recipient list associated with the received document type.

5. The method of claim 1 further comprising:
    Blocking transmission of the document to destinations that are not associated with the recipients listed on the selected recipient list.

6. The method of claim 1 further comprising:
    Detecting a condition that either a data value representing approval has been received from all of the members of the recipient list or a data value representing approval has been received from one of the members of the recipient list;
    Upon detection of the condition, determining a transmission destination for the approved document data file; and
    Transmitting the approved document data file to the determined destination.

7. The method of claim 1 further comprising:
    Detecting a condition that either a data value representing approval has been received from all of the members of the recipient list or a data value representing approval has been received from one of the members of the recipient list; and Upon detection of the condition, transmitting a message embodying data representing an approval of the identified document.

8. A system comprised of a computer adapted to perform any one of the methods recited by claims 1, 2, 3-7.

9. A non-transitory computer readable medium containing computer program code that when run causes the performance of any one of the methods recited by claims 1, 2, 3-7.

* * * * *